United States Patent
Li

(10) Patent No.: US 8,398,098 B2
(45) Date of Patent: Mar. 19, 2013

(54) STROLLER CONNECTABLE WITH A CAR SEAT

(75) Inventor: Dao-Chang Li, Taipei (TW)

(73) Assignee: Wonderland Nurserygoods Company Limited, Central (HK)

( * ) Notice: Subject to any disclaimer, the term of this patent is extended or adjusted under 35 U.S.C. 154(b) by 0 days.

(21) Appl. No.: 13/473,135

(22) Filed: May 16, 2012

(65) Prior Publication Data

US 2012/0228843 A1    Sep. 13, 2012

Related U.S. Application Data

(62) Division of application No. 12/923,547, filed on Sep. 28, 2010, now Pat. No. 8,205,894.

(30) Foreign Application Priority Data

Oct. 14, 2009   (CN) .......................... 2009 1 0208027

(51) Int. Cl.
    *B62B 9/28* (2006.01)
(52) U.S. Cl. .................................... 280/47.38
(58) Field of Classification Search ............... 280/47.38, 280/47.34, 638, 35, 639, 642, 647, 650, 657, 280/658
    See application file for complete search history.

(56) References Cited

U.S. PATENT DOCUMENTS

| | | | |
|---|---|---|---|
| 5,195,770 A | 3/1993 | Ishikura | |
| 5,417,449 A * | 5/1995 | Shamie | .......................... 280/642 |
| 5,979,928 A | 11/1999 | Kuo | |
| 6,062,589 A | 5/2000 | Cheng | |
| 6,267,406 B1 | 7/2001 | Huang | |
| 6,398,233 B1 | 6/2002 | Liang et al. | |
| 6,669,212 B2 | 12/2003 | Porter | |
| 6,824,162 B2 | 11/2004 | Yeh | |
| 7,040,694 B2 | 5/2006 | Sedlack | |
| 7,070,197 B2 | 7/2006 | Chen | |
| 7,320,471 B2 | 1/2008 | Maciejczyk | |
| 7,513,512 B2 | 4/2009 | Yoshie et al. | |
| 7,694,996 B2 | 4/2010 | Saville et al. | |
| 7,775,532 B2 | 8/2010 | Chen et al. | |

(Continued)

FOREIGN PATENT DOCUMENTS

| | | |
|---|---|---|
| CN | 101 411 572 A | 4/2009 |
| CN | 201 587 427 U | 9/2010 |

(Continued)

OTHER PUBLICATIONS

Office Action issued on Nov. 24, 2011 in corresponding Chinese application No. 2009 10208027.9.

(Continued)

*Primary Examiner* — Katy M Ebner
*Assistant Examiner* — Brodie Follman
(74) *Attorney, Agent, or Firm* — Bacon & Thomas, PLLC

(57) ABSTRACT

A stroller is connectable with a car seat, and includes a frame, and a stroller seat disposed on the frame. The stroller further includes a pair of opposing connecting rods mounted on the frame for supporting the stroller seat. The stroller seat is convertible between an upright position whereat the stroller seat is substantially vertical and connectable with the car seat, and a horizontal position whereat the stroller seat is substantially horizontal and adapted to be seated. The stroller seat includes a support frame operable to extend beyond and rise above the stroller seat to engage the car seat in the upright position, and operable to be moved to be lower than the stroller seat in the horizontal position.

6 Claims, 7 Drawing Sheets

U.S. PATENT DOCUMENTS

| | | | |
|---|---|---|---|
| 8,186,705 B2* | 5/2012 | Greger et al. | 280/643 |
| 8,205,894 B2* | 6/2012 | Li | 280/47.38 |
| 8,240,700 B2* | 8/2012 | Greger et al. | 280/648 |
| 8,256,792 B2* | 9/2012 | Conrad et al. | 280/648 |
| 2002/0060444 A1 | 5/2002 | Cote | |
| 2003/0111825 A1* | 6/2003 | Lo et al. | 280/642 |
| 2003/0122351 A1 | 7/2003 | Yeh | |
| 2004/0032103 A1 | 2/2004 | Hsia | |
| 2004/0075229 A1 | 4/2004 | Huntley | |
| 2004/0124611 A1* | 7/2004 | Gong et al. | 280/642 |
| 2005/0242535 A1* | 11/2005 | Chen | 280/47.38 |
| 2007/0108710 A1 | 5/2007 | Pennisi et al. | |
| 2007/0257458 A1 | 11/2007 | Dotsey et al. | |
| 2007/0267834 A1 | 11/2007 | Amdahl et al. | |
| 2008/0157491 A1 | 7/2008 | Chen et al. | |
| 2009/0127810 A1* | 5/2009 | Dotsey et al. | 280/47.371 |
| 2009/0127827 A1* | 5/2009 | Pike et al. | 280/648 |
| 2009/0160162 A1 | 6/2009 | Bizzell et al. | |
| 2010/0038886 A1 | 2/2010 | Greger et al. | |
| 2010/0044985 A1 | 2/2010 | Fiore, Jr. | |
| 2010/0078916 A1* | 4/2010 | Chen | 280/648 |
| 2010/0102535 A1* | 4/2010 | Zhong | 280/650 |
| 2010/0140902 A1 | 6/2010 | Zehfuss | |
| 2010/0171289 A1 | 7/2010 | Greger et al. | |
| 2010/0230933 A1* | 9/2010 | Dean et al. | 280/647 |
| 2010/0244393 A1 | 9/2010 | Thomas et al. | |
| 2010/0244527 A1 | 9/2010 | Chen | |
| 2010/0282800 A1* | 11/2010 | Li et al. | 224/409 |
| 2010/0327561 A1 | 12/2010 | Zhong | |
| 2011/0025022 A1* | 2/2011 | Li | 280/647 |
| 2011/0031708 A1 | 2/2011 | Cheng | |
| 2011/0068549 A1 | 3/2011 | Chen | |
| 2011/0084468 A1* | 4/2011 | Li | 280/658 |
| 2011/0175305 A1* | 7/2011 | Chen et al. | 280/30 |
| 2011/0175406 A1 | 7/2011 | Zeng | |
| 2011/0233903 A1 | 9/2011 | Williams et al. | |
| 2012/0193893 A1* | 8/2012 | Conrad et al. | 280/647 |

FOREIGN PATENT DOCUMENTS

GB       2 392 887 A       3/2004

OTHER PUBLICATIONS

Office Action issued on z Oct. 14, 2011 in corresponding Great Britain application No. 101 6021.6.

* cited by examiner

STROLLER CONNECTABLE WITH A CAR SEAT

CROSS-REFERENCE TO RELATED APPLICATION

The present application is a Divisional application of U.S. patent application Ser. No. 12/923,547, filed Sep. 28, 2010, which claims priority of Chinese Application No. 200910208027.9, filed on Oct. 14, 2009.

BACKGROUND OF THE INVENTION

1. Field of the Invention

The present invention relates to a stroller assembly, more particularly to a stroller assembly that is connectable with a baby's car seat.

2. Description of the Related Art

When a baby is to travel first by car and then in a stroller, a car seat has to be provided on the car for the baby, and the baby has then to be moved from the car seat to the stroller upon leaving the car. To solve the problems described above, a car seat that can be connected to a stroller has been proposed, for example as described in U.S. Pat. Nos. 6,070,890 and 6,572,134, which each offers convenience in usage.

SUMMARY OF THE INVENTION

The object of the present invention is to provide a stroller that is capable of supporting a car seat without having to dramatically change the design of the stroller.

According to a first aspect of the present invention, there is provided a stroller assembly that is adapted to support a baby's car seat thereon. The stroller assembly comprises: a frame; a stroller seat disposed on the frame; and a pair of opposing connecting rods mounted on the frame for supporting the stroller seat. The stroller seat is convertible between an upright position whereat the stroller seat is substantially vertical and connectable with the car seat, and a horizontal position whereat the stroller seat is substantially horizontal and adapted to be seated. The stroller seat includes a support frame operable to extend beyond and rise above the stroller seat to engage the car seat in the upright position, and operable to be moved to be lower than the stroller seat in the horizontal position.

According to a second aspect of the present invention, there is provided a stroller assembly that is adapted to support a baby's car seat thereon. The stroller assembly comprises: a frame; a stroller seat disposed on the frame; a pair of opposing connecting rods mounted on the frame for supporting the stroller seat; and a backrest mounted on the frame and pivoted to the connecting rods so as to be pivotable relative to the connecting rods. A support frame is pivotally connected to the backrest so as to be pivotable relative to the backrest between an extended position whereat the support frame is engageable with and support the car seat, and a collapsed position whereat the support frame is collapsible to provide a space for the stroller seat.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
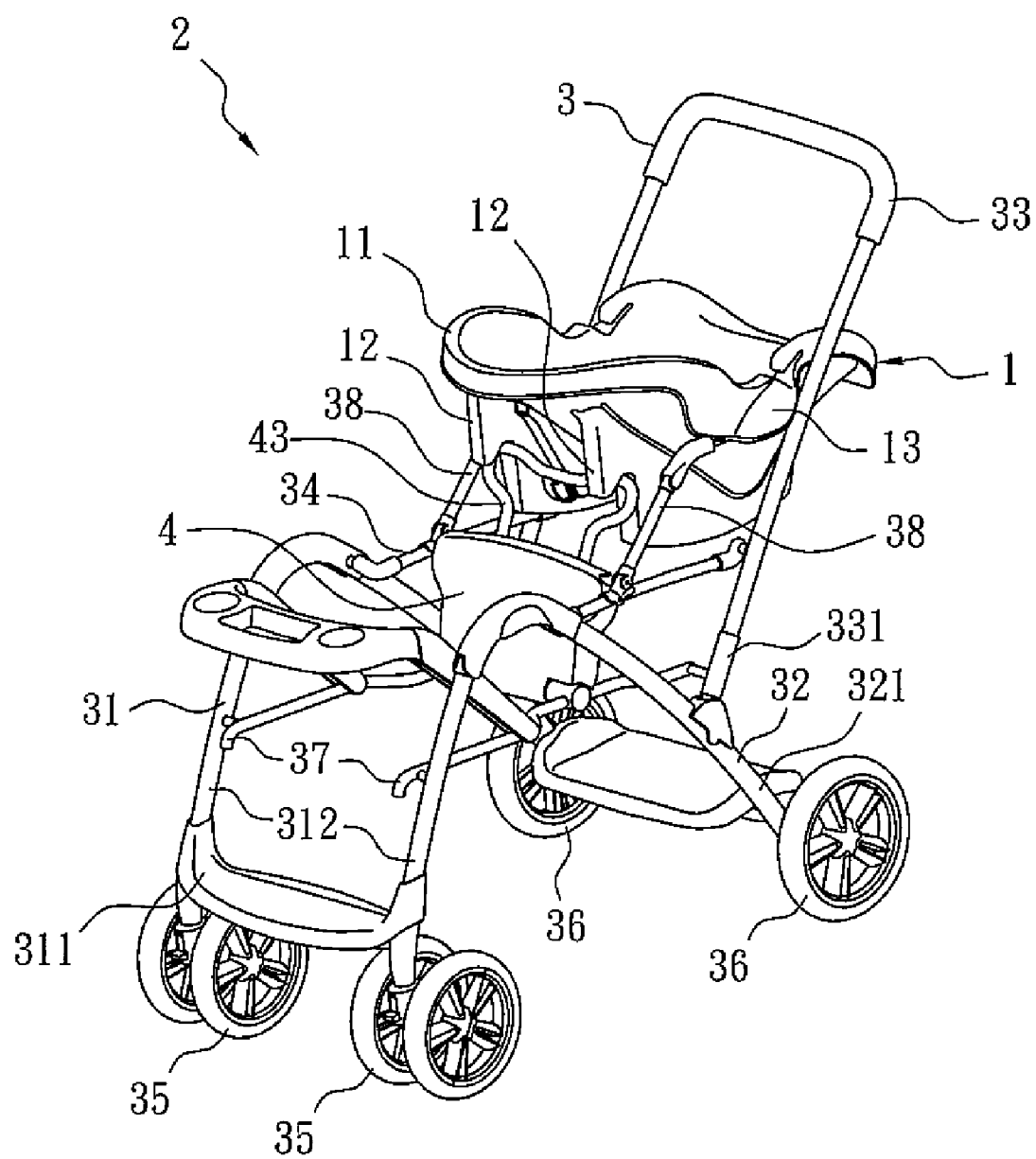
FIG. 1 is a perspective view of the first preferred embodiment of a stroller assembly according to this invention.

Referring to FIGS. 1, 4 to 6, 8, and 9, the preferred embodiment of a stroller assembly according to this invention includes a car seat 1 and a stroller 2 for supporting the car seat 1. The car seat 1 includes a seat body 11 and an engaging member disposed on the seat body 11. The stroller 2 includes a frame 3 and a stroller seat 4. The frame 3 includes a front leg frame 31, a rear leg frame 32, a back frame 33, two armrests 34, a pair of front wheels 35, and a pair of rear wheels 36. The front leg frame 31 is generally U-shaped, and includes a front leg rail 311 and two front legs 312 connected respectively to two ends of the front leg rail 311. The front wheels 35 are disposed respectively on bottom ends of the front legs 312. The rear leg frame 32 includes two rear legs 321 connected respectively and pivotally to top ends of the front legs 312. The rear wheels 36 are disposed respectively on bottom ends of the rear legs 321. The back frame 33 is in an inverted U-shape, and has two bottom ends connected respectively and pivotally to two rear leg connecting rods 331 that are connected respectively and pivotally to the rear legs 321 at bottom ends thereof. The armrests 34 have front ends connected respectively and pivotally to top ends of the rear legs 321, and rear ends connected respectively and pivotally to two sides of the back frame 33. The rear armrests 38 have front ends connected respectively and pivotally to the armrests 34, and rear ends connected respectively and pivotally to the rear leg connecting rods 331 of the frame 3.

The stroller seat 4 is disposed in a space defined by the front and the rear legs 312, 321 as well as the back frame 33. The stroller seat 4 is connected pivotally to a pair of opposite connecting rods 37 having front ends connected respectively to the front legs 312 of the front leg frames 31, and rear ends connected respectively to the rear leg connecting rods 331 of the back frame 33. By this arrangement, the stroller seat 4 is pivotable between an upright position whereat the stroller seat 4 is substantially vertical and connectable to the car seat 1, and a horizontal position whereat the stroller seat 4 is substantially horizontal and the baby can sit thereon.

Figure 2:
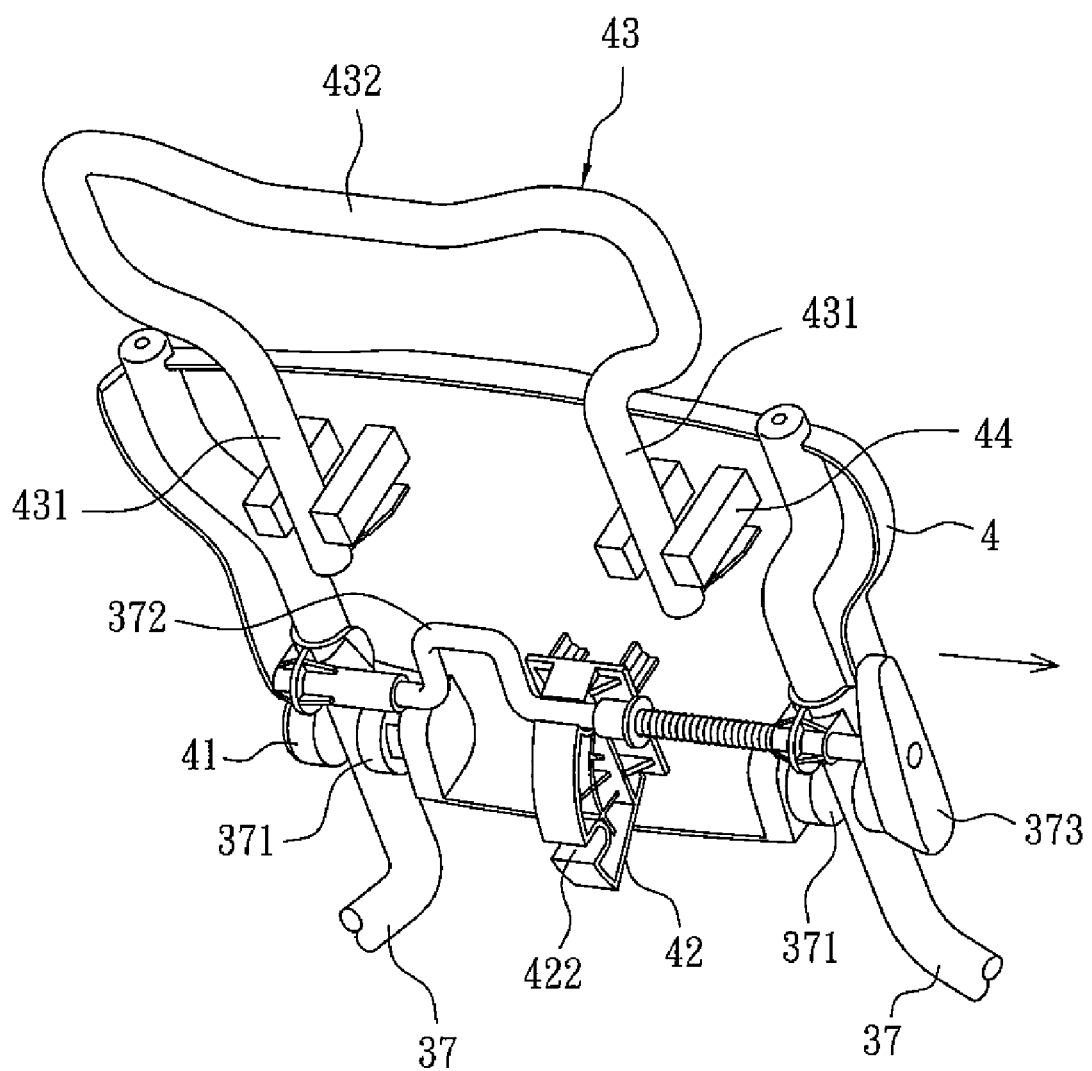
FIG. 2 is a perspective view of a stroller seat of the first preferred embodiment with the adjusting shaft in its locking position.
Figure 3:
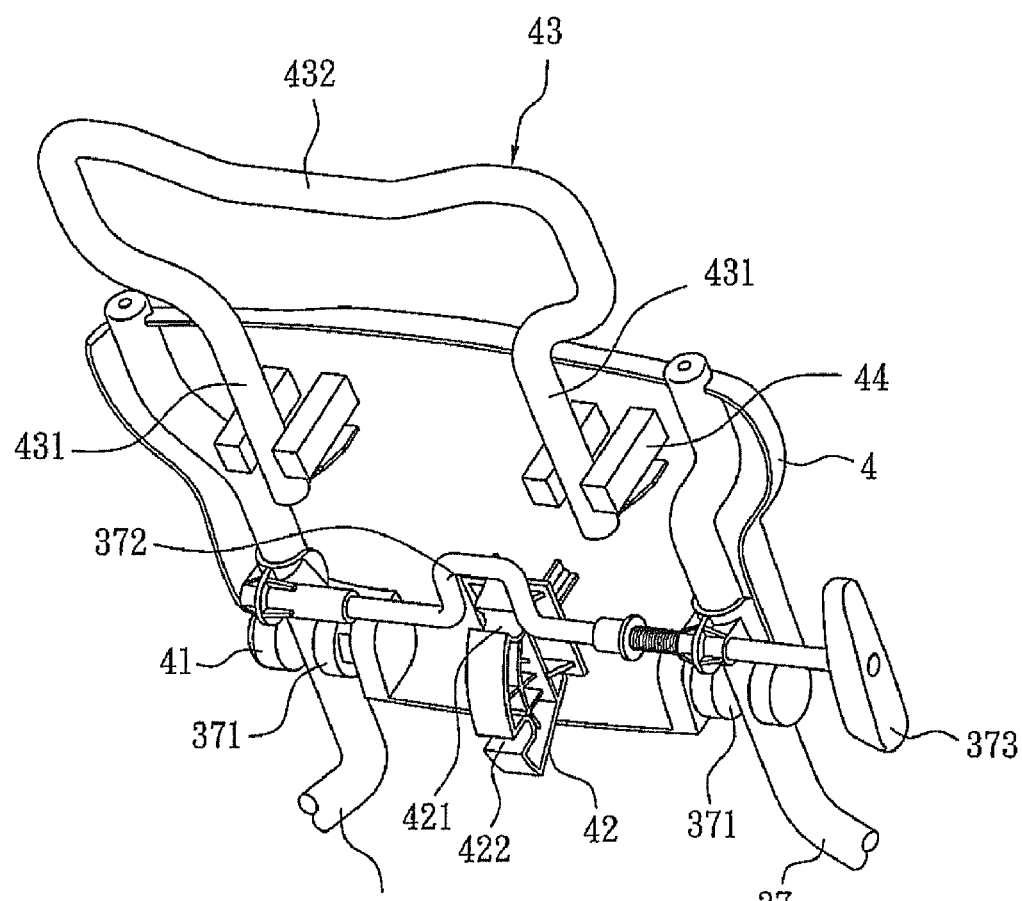
FIG. 3 is a perspective view of a stroller seat of the first preferred embodiment with the adjusting shaft in its unlocking position.

As can be more clearly seen from FIGS. 2 and 3, the stroller seat 4 is pivotally mounted on the pivot mountings 41, 371, and consists an inverted U-shape support frame 43 pivotally mounted on the undersurface of the stroller seat 4. The support frame 43 comprises an upper horizontal rod 432 interconnecting two vertical rods 431 which have their lower ends pivotally engaged in respective retaining blocks 44. By such arrangement, the support frame 43 may be pulled out to extend beyond the stroller seat 4. The upper horizontal rod 432 provides a support position for the front retaining portion 12 of the car seat 1.

An adjusting shaft 372 extends transversely on the undersurface of the stroller seat 4, and is designed to reciprocally move between locking and unlocking positions. The adjusting shaft 372 consists an inverted U-shape portion at substantially the intermediate portion thereof.

The stroller seat 4 has a segment 42 provided at the undersurface. The segment 42 comprises a first retaining groove 421 and a second retaining groove 422 along the periphery thereof. The first and second retaining grooves 421 and 422 are configured to receive a portion of the adjusting shaft 372 therein, as will be explained hereinafter.

FIG. 2 illustrates the adjusting shaft 372 disposed at a locking position whereat a portion of the adjusting shaft 372 is engaged in the first retaining groove 421. In this position, the stroller seat 4 is locked and the baby can sit upright thereon. When the handle 373 is pulled to the right as shown by the arrow direction, the adjusting shaft 372 moves towards the right direction, and that portion of the adjusting shaft 372 is disengaged from the first retaining groove 421 to dispose the adjusting shaft 372 in an unlocking position. The stroller seat 4 is thus unlocked and may pivot relative to the adjusting shaft 372. When the stroller seat 4 is pivoted to the upright position, the segment 42 attached to the stroller seat 4 is moved to bring the second retaining groove 422 thereof in alignment with the adjusting shaft 372. As the handle 373 is moved to the left, a portion of the adjusting shaft 372 is engaged in this second retaining groove 422, thereby securing the stroller seat 4 in its upright position.

Figure 5:
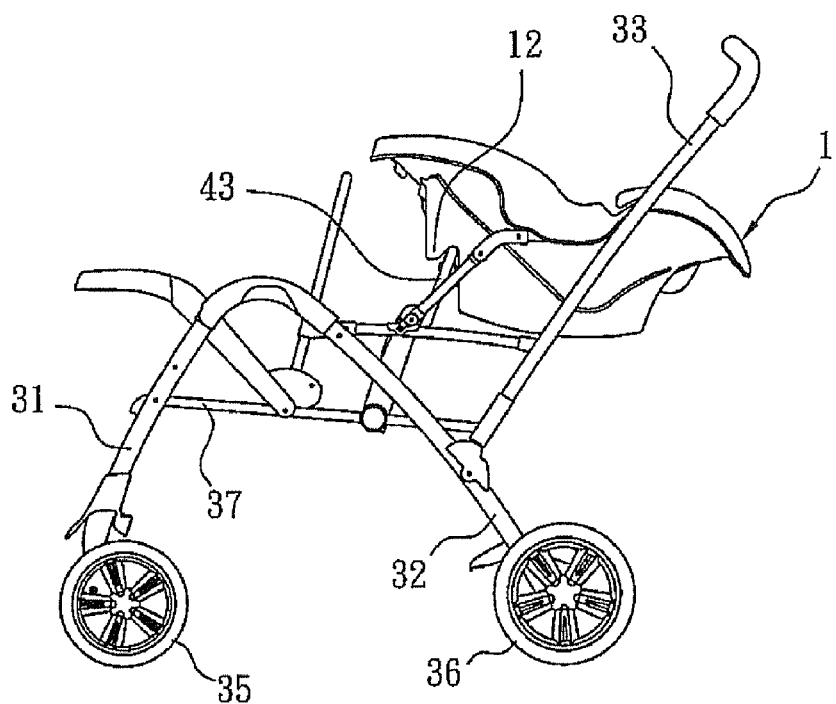
FIG. 5 is a side view to illustrate the stroller seat of the first preferred embodiment in its substantially vertical position to support and hold the car seat.

FIGS. 1 and 5 illustrate the condition in which the stroller seat 4 stands upright in its upright position. In this condition, the support frame 43 is telescopically extended beyond and risen above the stroller seat 4, or is pivoted out of and risen above the stroller seat 4, so that the upper horizontal rod 432 of the support frame 43 may provide a support position for the front retaining portions 12 of the car seat 1, while each of the rear retaining portion 13 of the car seat 1 is supported by respective upper portion of the rear armrest 38. In this manner, the car seat 1 is securely supported.

Figure 4:
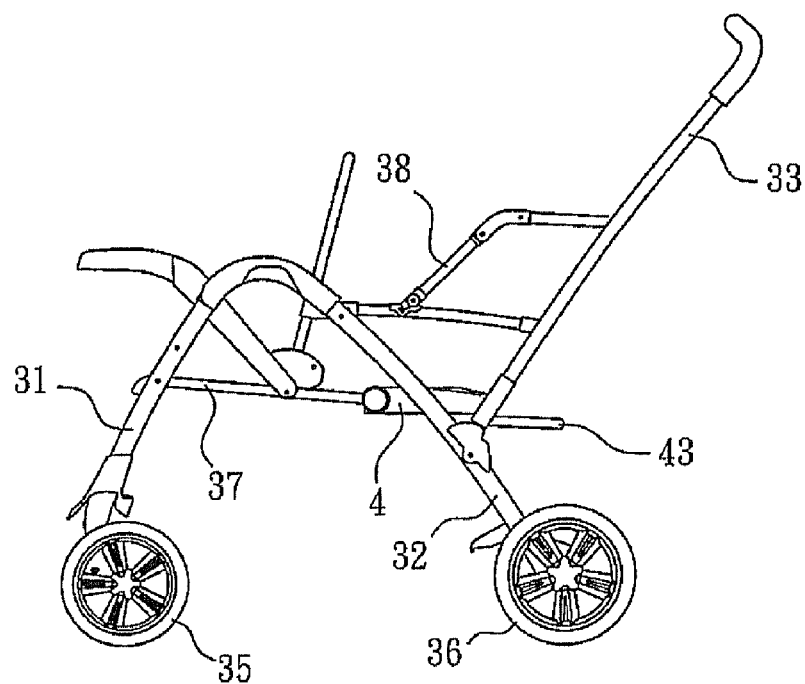
FIG. 4 is a side view to illustrate the stroller seat of the first preferred embodiment in its seated (horizontal) position.

FIG. 4 is a side view to illustrate the stroller seat 4 of the stroller 2 according to the present invention in its seated (horizontal) position and the baby can sit upright thereon. In this horizontal position, the stroller seat 4 is substantially horizontal and the support frame 43 is located lower than the stroller seat 4, so that the baby can sit upright on the stroller seat 4.

A further embodiment according to the present invention is shown in FIGS. 6 to 9. In the drawings, like numerals indicate like elements, and the descriptions of some elements that are identical to those of the first embodiment shall be omitted.

Figure 6:
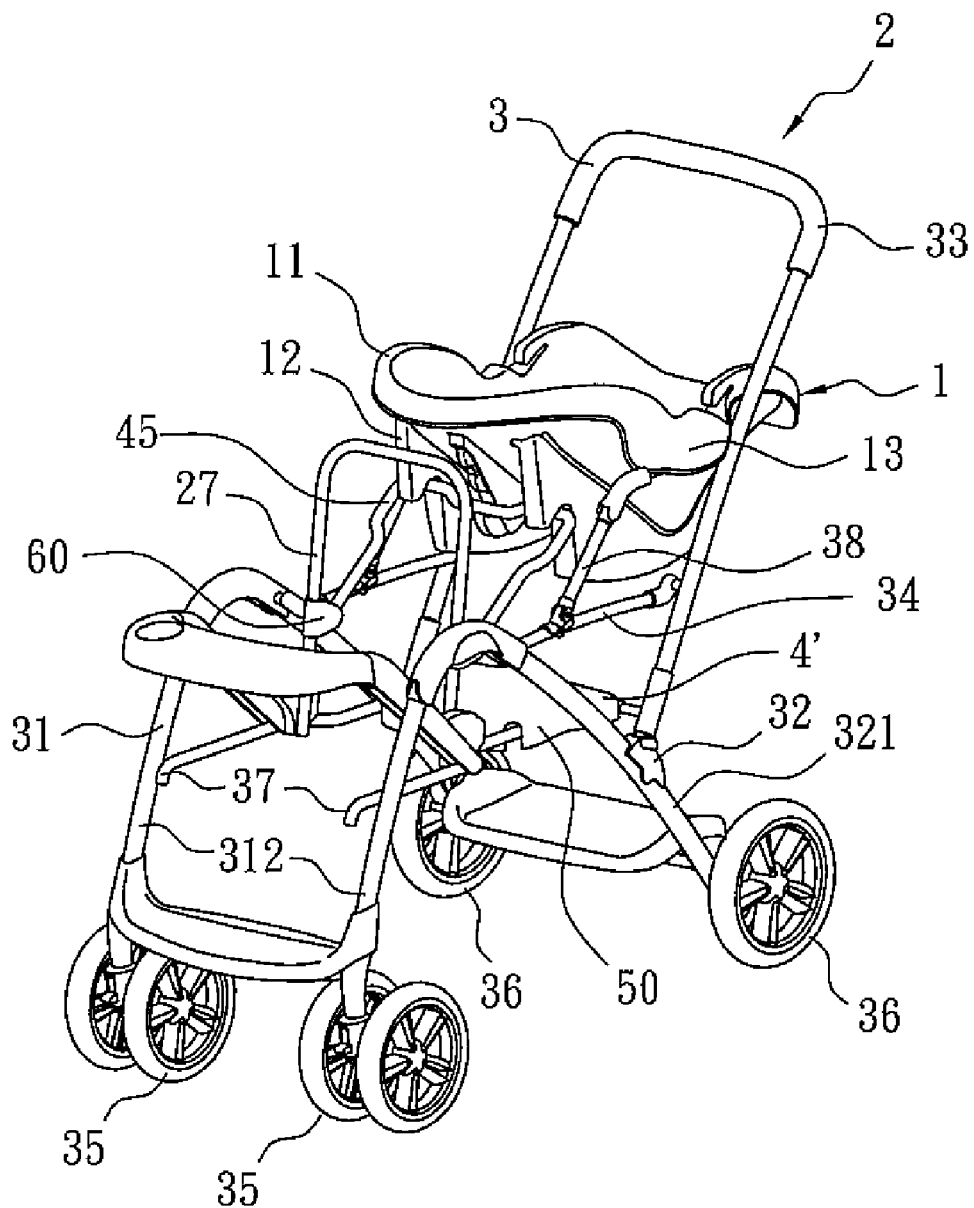
FIG. 6 is a perspective view of the second preferred embodiment of a stroller assembly according to this invention.

Referring to FIG. 6, the second preferred embodiment of the present invention is different from the first preferred embodiment in that the support frame is not attached to the stroller seat, but rather is attached to a backrest 27.

In this preferred embodiment, stroller 2 likewise comprises a frame 3 and a stroller seat 4'. The stroller seat 4' is disposed in a space defined by the front and the rear legs 312, 321 as well as the back frame 33.

Figure 7:
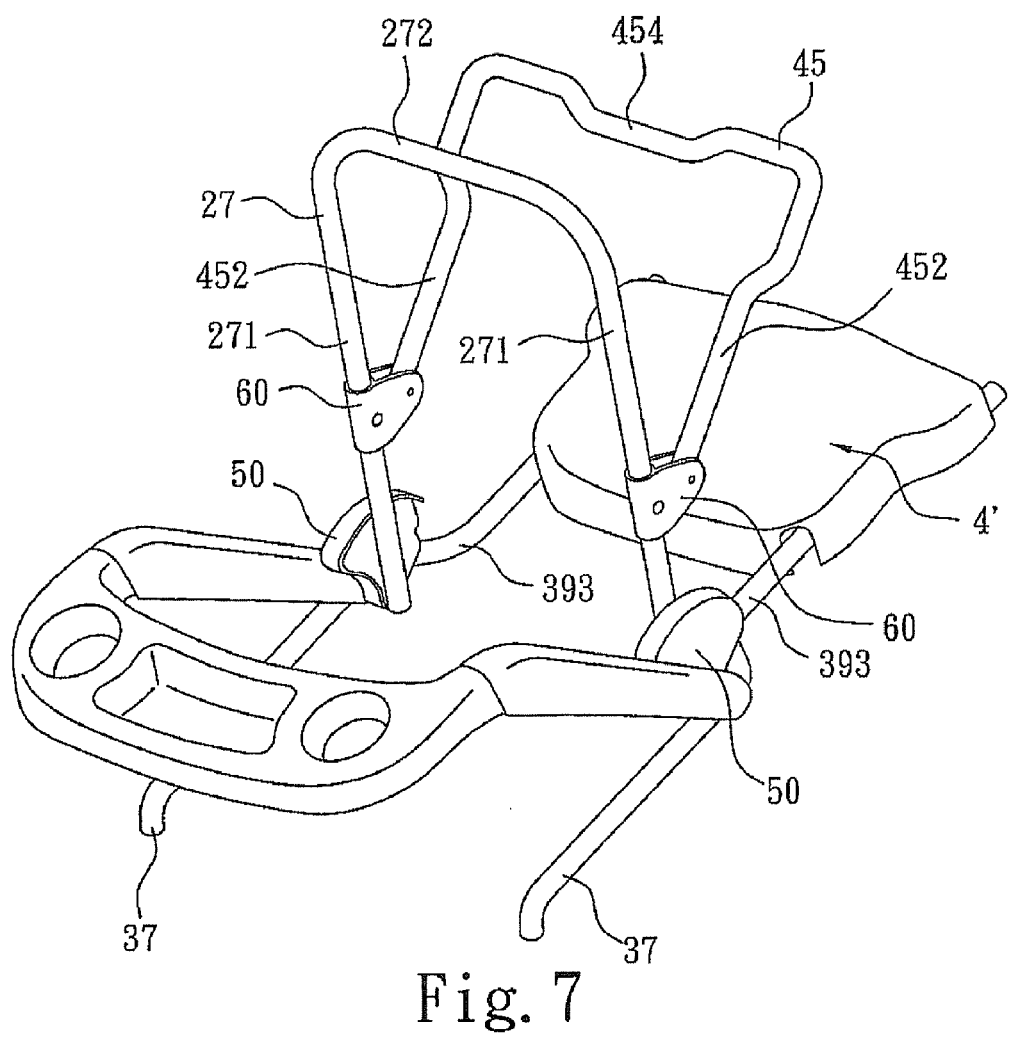
FIG. 7 is a perspective view of a support device of the second preferred embodiment for supporting and holding the car seat.
Figure 8:
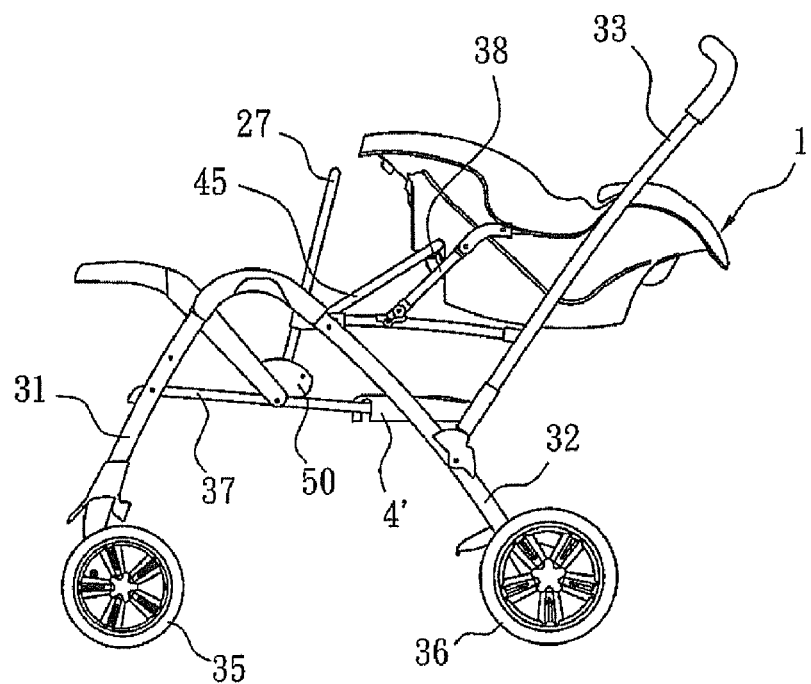
FIG. 8 is a side view to illustrate the support frame of the stroller according to the second embodiment of the present invention being pivoted to an extended position to support the car seat.

FIG. 7 is a perspective view to illustrate in detail the structure of the second embodiment according to this invention that may securely support the car seat. The stroller seat 4' is supported by a pair of opposite connecting rods 393 having front ends connected respectively to an first actuation device 50. A backrest 27 is pivoted to the first actuation device 50 so that it is pivotable relative to the connecting rods 393. The backrest 27 is in an inverted U-shape, and comprises an upper horizontal rod 272 interconnecting two vertical rods 271 which have their lower ends pivoted respectively to the first actuation devices 50.

Figure 9:
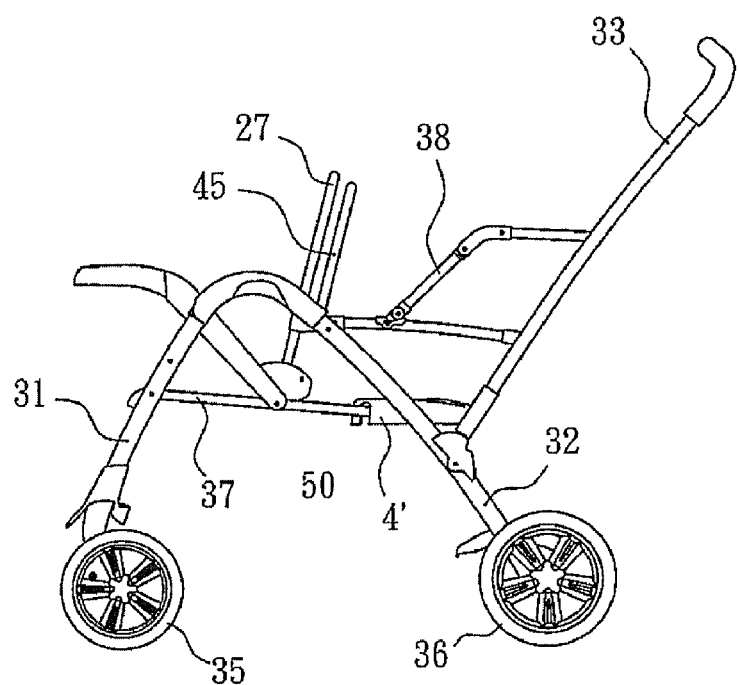
FIG. 9 is a side view to illustrate the support frame of the stroller according to the second embodiment of the present invention being pivoted to a collapsed position in case where it is unnecessary to support the car seat.

A support frame 45 is pivotally connected to the backrest 27. The support frame 45 is substantially in an inverted U-shape, and comprises an upper horizontal rod 454 interconnecting two vertical rods 452. The vertical rods 452 of the support frame 45 have their lower ends pivoted respectively to second actuation devices 60 mounted on respective vertical rods 271 of the backrest 27. By such arrangement, the support frame 45 is pivotable relative to the backrest 27 between extended and collapsed positions. In case it is needed to support the car seat 1 (see also FIG. 8), the support frame 45 is pivoted relative to the backrest 27 to the extended position whereat it is inclined to the backrest 27 and has its upper horizontal rod 454 provides a support position for the front retaining portions 12 of the car seat 1. Meanwhile, each of the rear retaining portion 13 of the car seat 1 is supported by respective upper portion of the rear armrest 38. In this manner, the car seat 1 is securely supported. Referring to FIG. 9, in case the car seat 1 is not needed, the support frame 45 is pivoted relative to the backrest 27 to a collapsed position whereat the support frame 45 is pivoted towards and urged against the backrest 27 so as to provide a space for the stroller seat 4'.

Although the foregoing has been described in terms of presently preferred and alternate embodiments, those skilled in the art will recognize that the invention is not limited to the embodiments described. The apparatus of the present invention can be practiced with modification and alteration within the spirit and scope of the appended claims. The description is thus to be regarded as illustrative instead of limiting the present invention.

I claim:

1. A stroller adapted to be connected with a car seat and comprising: a frame; a stroller seat disposed on said frame; a pair of opposing connecting rods mounted on said frame for supporting said stroller seat; a backrest mounted on said frame and pivoted to said connecting rods so as to be pivotable relative to said connecting rods; and a support frame pivotally connected to said backrest so as to be pivotable relative to said backrest between an extended position whereat said support frame is engageable with and supports said car seat, and a collapsed position whereat said support frame is collapsible to allow the stroller seat to be seated;

wherein said support frame is substantially in an inverted U-shape, and comprises a pair of opposing vertical rods, and an upper horizontal rod interconnecting said vertical rods, said upper horizontal rod is configured to engage with a first retaining portion of said car seat, so as to support said car seat; and wherein the frame further includes a back frame and a rear armrest, one end of the rear armrest is connected to the back frame, and the rear armrest abuts against a second retaining portion of the car seat so as to firmly support the car seat.

2. The stroller as claimed in claim 1, wherein the frame further includes an armrest and a front leg frame, the armrest is connected to the front leg frame and the back frame, and another end of the rear armrest is connected to a middle portion of the armrest.

3. The stroller as claimed in claim 2, wherein the frame further includes a rear leg frame, the rear leg frame is connected to the front leg frame, and the back frame is connected to the rear leg frame.

4. The stroller as claimed in claim 1, wherein a middle portion of the upper horizontal rod is recessed so that the upper horizontal rod together with the vertical rods constitute a substantial M shape.

5. A stroller adapted to be connected with a car seat and comprising: a frame; a stroller seat disposed on said frame; a pair of opposing connecting rods mounted on said frame for supporting said stroller seat; a backrest mounted on said frame and pivoted to said connecting rods so as to be pivotable relative to said connecting rods; and a support frame pivotally connected to said backrest so as to be pivotable relative to said backrest between an extended position whereat said support frame is engageable with and supports said car seat, and a collapsed position whereat said support frame is collapsible to allow the stroller seat to be seated;

wherein said support frame is substantially in an inverted U-shape, and comprises a pair of opposing vertical rods, and an upper horizontal rod interconnecting said vertical rods, said upper horizontal rod is configured to engage with a first retaining portion of said car seat, so as to support said car seat; and wherein the support frame is pivoted to a second actuation device mounted on a middle portion of the backrest.

6. The stroller as claimed in claim 1, wherein the frame further includes a front leg frame and a rear leg frame, two ends of a connecting rod are respectively connected to the front leg frame and the rear leg frame, a first actuation device is mounted on a middle portion of the connecting rod, the backrest is pivoted to the first actuation device, a stroller seat is connected to a rear portion of the connecting rod, the support frame is mounted to the backrest and situated behind the backrest, and the support frame may be pivotally rotated with respect to the backrest and toward the stroller seat so as to present a supporting state.

* * * * *